United States Patent
Chang (10) Patent No.: US 8,971,462 B2
(45) Date of Patent: Mar. 3, 2015

(54) CHANNEL QUALITY DETERMINING CIRCUIT AND RELATED METHOD THEREOF

(75) Inventor: Chung-Yao Chang, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 177 days.

(21) Appl. No.: 13/246,869

(22) Filed: Sep. 28, 2011

(65) Prior Publication Data

US 2012/0082273 A1    Apr. 5, 2012

(30) Foreign Application Priority Data

Oct. 1, 2010   (TW) .............................. 99133589 A (51) Int. Cl.
*H03D 1/04*       (2006.01)
*H04B 17/00*      (2006.01)

(52) U.S. Cl.
CPC ........ *H04B 17/0045* (2013.01); *H04B 17/0042* (2013.01)
USPC ........... 375/346; 375/340; 375/349; 375/350; 375/316; 455/226.1; 455/226.3; 455/226.4

(58) Field of Classification Search
USPC ......... 455/226.1, 226.3, 226.4; 375/340, 349, 375/350, 346, 316
See application file for complete search history.

(56) References Cited

U.S. PATENT DOCUMENTS

| | | | | |
|---|---|---|---|---|
| 6,005,851 A * | 12/1999 | Craddock et al. | ............. | 370/329 |
| 7,733,938 B2 * | 6/2010 | Yang et al. | .................... | 375/132 |
| 7,813,272 B2 * | 10/2010 | Seki | .............................. | 370/229 |
| 8,089,963 B2 * | 1/2012 | Melman et al. | ............... | 370/389 |
| 2003/0053414 A1 * | 3/2003 | Akahane et al. | ............... | 370/216 |
| 2003/0198220 A1 * | 10/2003 | Gross et al. | .................... | 370/389 |
| 2007/0060132 A1 * | 3/2007 | Wilhelmsson et al. | ........ | 455/445 |
| 2007/0070956 A1 | 3/2007 | Seki | | |

FOREIGN PATENT DOCUMENTS

TW   200908579 A   8/2007
TW   200412757 A   9/2007

OTHER PUBLICATIONS

TW Office Action dated Jul. 19, 2013.
CN Office Action dated Dec. 19, 2013.

* cited by examiner

*Primary Examiner* — Rahel Guarino
(74) *Attorney, Agent, or Firm* — McClure, Qualey & Rodack, LLP (57) ABSTRACT

A channel quality determining circuit includes a receiving circuit and a determining circuit. The receiving circuit is used for receiving a header of at least one packet transmitted in a signal transmitting channel. The determining circuit is coupled to the receiving circuit, and used for determining if a channel quality of the signal transmitting channel satisfies a predetermined quality standard according to the header of at least one packet.

15 Claims, 5 Drawing Sheets

CHANNEL QUALITY DETERMINING CIRCUIT AND RELATED METHOD THEREOF

BACKGROUND OF THE INVENTION

1. Field of the Invention

The present invention relates to a channel quality determining circuit and related method thereof, and more particularly, to a circuit that determines a channel quality of a signal transmitting channel according to a header of a packet and related method thereof.

2. Description of the Prior Art

General local area network (LAN) systems include a specific signal transmitting frequency band. Since some of the frequency bands are free for use, overlapped bands may be utilized by some different LAN systems for transmitting signals. For example, center frequencies of the signal transmitting frequency bands in Bluetooth (BT) system and wireless local area network (WLAN) system are substantially at 2.4 GHz. Thus, if the BT system and the WLAN system are working simultaneously, the transmitted signals may probably interfere with each other. More specifically, since a working bandwidth of a channel in the BT system is 1 MHz and there are 79 channels ranging from 2402 MHz to 2480 MHz, while the operational frequency band of the WLAN system is within a range from 2412 MHz to 2484 MHz, the channels utilized by the two communication protocols described above are substantially overlapped. In a case where the WLAN system is currently working, if the BT system also wants to transmit data via a working frequency band overlapped with the working frequency band of the WLAN system, the signal transmission quality of the WLAN system is affected. Similarly, the working WLAN system also has a severe interfere to the BT system. Thus, how to enable a plurality of different wireless transmitting systems whose operational frequency bands are overlapped with each other to quickly determine an available channel to avoid using an interfered channel is an issue to be solved in the pertinent field.

SUMMARY OF THE INVENTION

Therefore, one of the objectives of the present invention is to provide a circuit that determines a channel quality of a signal transmitting channel according to a header of a packet and related methods thereof, in order to determine an available channel quickly.

According to a first exemplary embodiment of the present invention, a channel quality determining circuit is provided. The channel quality determining circuit comprises a receiving circuit and a determining circuit. The receiving circuit is utilized for receiving a header of at least one packet transmitted in a signal transmitting channel. The determining circuit is coupled to the receiving circuit, for determining if a channel quality of the signal transmitting channel satisfies a predetermined quality standard according to the header of at least one packet.

According to a second exemplary embodiment of the present invention, a channel quality determining method is provided. The channel quality determining method comprises the step that: receiving a header of at least one packet transmitted in a signal transmitting channel; and determining if a channel quality of the signal transmitting channel satisfies a predetermined quality standard according to the header of at least one packet.

These and other objectives of the present invention will no doubt become obvious to those of ordinary skill in the art after reading the following detailed description of the preferred embodiment that is illustrated in the various figures and drawings.

DETAILED DESCRIPTION

Basically, a BT system is a frequency-hopping system, and may use an adaptive frequency-hopping (AFH) technology to avoid the interference from a signal within a constant frequency band.

In general, a device including a BT system may perform a software code for obtaining Bit-Error-Rate (BER) statistics. However, in order to obtain a correct channel quality analysis, the statistics should be derived from a huge number of packets in a long period of time. For example, if obtaining the statistic of each one of 79 channels in the BT system costs one second, the AFH mechanism would need 79 seconds to finish obtaining statistics of all channels.

Figure 1:
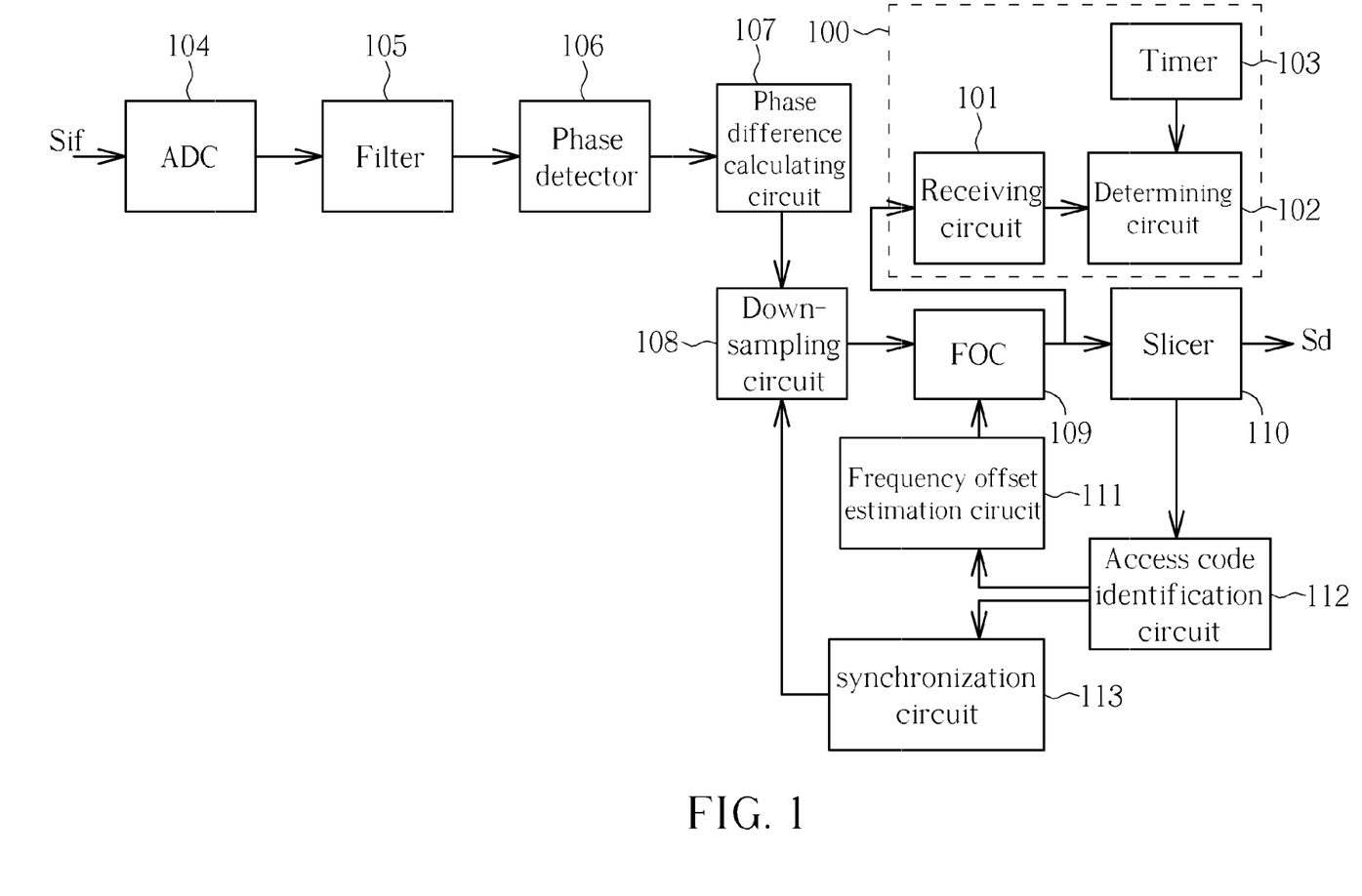
FIG. 1 is a diagram illustrating an exemplary embodiment of a channel quality determining circuit according to the present invention.

Therefore, in order to accelerate the process of determining the quality of a channel, the present invention proposes a channel quality determining circuit 100, as shown in FIG. 1. FIG. 1 is a diagram illustrating an exemplary embodiment of a channel quality determining circuit 100 according to the present invention. The channel quality determining circuit 100 includes a receiving circuit 101, a determining circuit 102 and a timer 103. Please note that FIG. 1 further shows a basic architecture diagram of a BT receiver for illustrating the spirit of the present invention more clearly. Therefore, FIG. 1 further shows an analog-to-digital converter (ADC) 104, a filter 105, a phase detector 106, a phase difference calculating circuit 107, a down-sampling circuit 108, a frequency offset compensation (FOC) circuit 109, a slicer 110, a frequency offset estimation circuit 111, an access code identification circuit 112 and a synchronization circuit 113. As the interconnection of above-mentioned components is shown in FIG. 1, further description is omitted here for brevity.

Moreover, the main function of the BT receiver shown in FIG. 1 is to convert a received analog intermediate frequency signal Sif into a digital output signal Sd, wherein the ADC 104 is utilized for converting an analog intermediate frequency signal into a digital intermediate frequency signal, and the filter 105 is utilized for performing digital filtering upon the digital intermediate frequency signal to generate a filtered digital signal, and the phase detector 106 is utilized for performing phase detection upon the filtered digital signal, the phase difference calculating circuit 107 is utilized for calculating the difference between phases of adjacent sampling points, the access code identification circuit 112 is utilized for confirming the access code of the received signal, the synchronization circuit 113 is utilized for performing time-domain synchronization upon the received signal, the frequency offset estimation circuit 111 is utilized for estimating the offset frequency of the received signal, the FOC circuit 109 is utilized for compensating the frequency of the received signal according to the estimated offset frequency generated by the frequency offset estimation circuit 111, and the slicer 110 is utilized for determining binary bits to generate the digital output signal Sd. The receiving circuit 101 is coupled to the FOC circuit 109 for receiving a header of at least one packet output by the FOC circuit 109, wherein the at least one packet is transmitted via a signal transmitting channel. The determining circuit 102 is coupled to the receiving circuit 101 for determining if a channel quality of the signal transmitting channel satisfy a predetermined quality standard according to the header of the at least one packet. The timer 103 is coupled to the receiving circuit 101 and the generating circuit 102, and used for counting a predetermined time period when the receiving circuit 101 starts operating. When the receiving circuit 101 receives the header of the at least one packet before the predetermined time period counted by the timer 103 expires, the determining circuit 102 determines if the channel quality of the signal transmitting channel satisfies the predetermined quality standard according to the header of the at least one packet. When the receiving circuit 101 fails to receive any headers from the signal transmitting channel when the predetermined time period counted by the timer 103 expires, the determining circuit 102 further determines that the channel quality of the signal transmitting channel fails to satisfy the predetermined quality standard.

Figure 2:
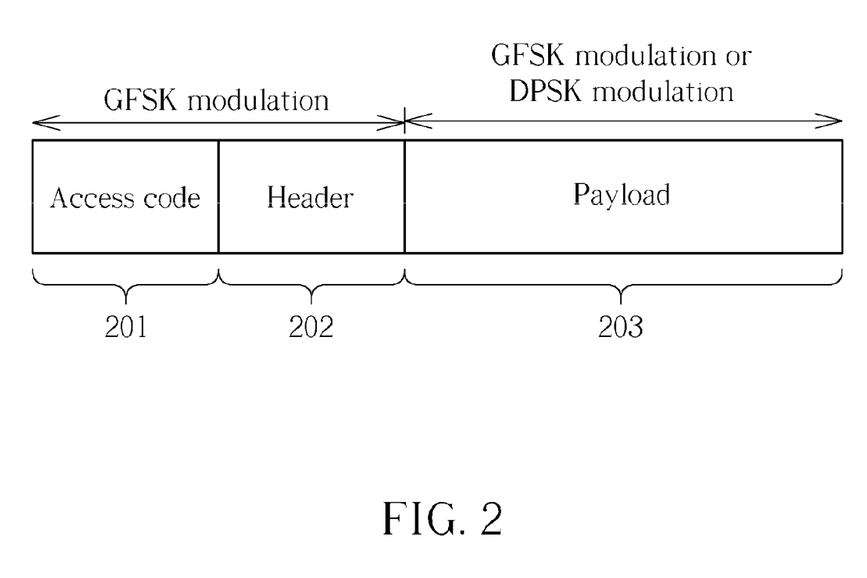
FIG. 2 is a diagram illustrating a packet format of a Bluetooth transmitting data.

Please refer to FIG. 2, which is a diagram illustrating a packet format 200 of a BT transmitting data. Generally, the packet format 200 includes an access code 201, a header 202 and a payload 203, wherein the access code 201 is utilized for indicating if the packet is the one that should be received by the BT system. That is, the access code 201 is for identification. The header 202 mainly carries data such as digital transmitting address, data type, etc. For example, the packet transmits images, voice or other types of digital data. The payload 203 is the actual data that is transmitted. Moreover, in one packet, the access code 201 and the header 202 are generated by shifting Gaussian Frequency Shift Keying (GFSK) modulation, while the payload 203 is generated by shifting GFSK modulation or Differential Phase Shift Keying (DPSK) modulation. When the payload 203 is transmitted at a basic rate (BR), it is generated by shifting GFSK modulation, and when the payload 203 is transmitted at an enhanced data rate (EDR), it is generated by shifting DPSK modulation. In other words, no matter whether the BT packet is transmitted at BR or EDR, the header 202 is generated by shifting GFSK modulation.

Since the GFSK modulation is a constant envelope modulation. Therefore, within a transmitting time T of the header 202, the receiving circuit 101 of the channel quality determining circuit 100 of the present invention samples at a plurality of time points t0, ..., tn after the phase of the received BT signal has been compensated by the FOC circuit 109 (i.e., the output of the FOC circuit 109), and generates a header quality (HQ) parameter according to the powers $S^2(0), \ldots, S^2(n)$ respectively corresponding to the obtained sampling points. The determining circuit 102 determines if the channel quality of the signal transmitting channel satisfies the predetermined quality standard according to the header quality parameter HQ of the header 202 of the packet. In this exemplary embodiment, the header quality parameter HQ may be expressed by following equation (1):

$$HQ = 10 * \log_{10}\left\{\frac{\max_n^{arg}(S^2(n))}{\min_n^{arg}(S^2(n))}\right\}, \text{ wherein } n = 0, 1, \ldots, 53 \quad (1)$$

Figure 3A:
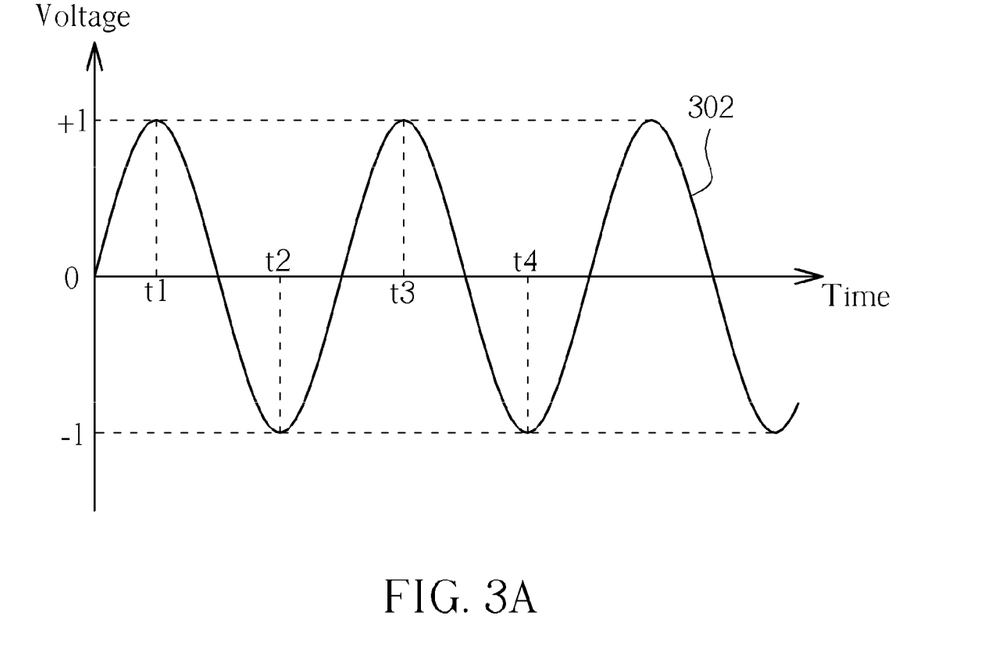
FIG. 3A is a signal timing diagram of an ideal header in a Bluetooth packet according to the present invention.
Figure 3B:
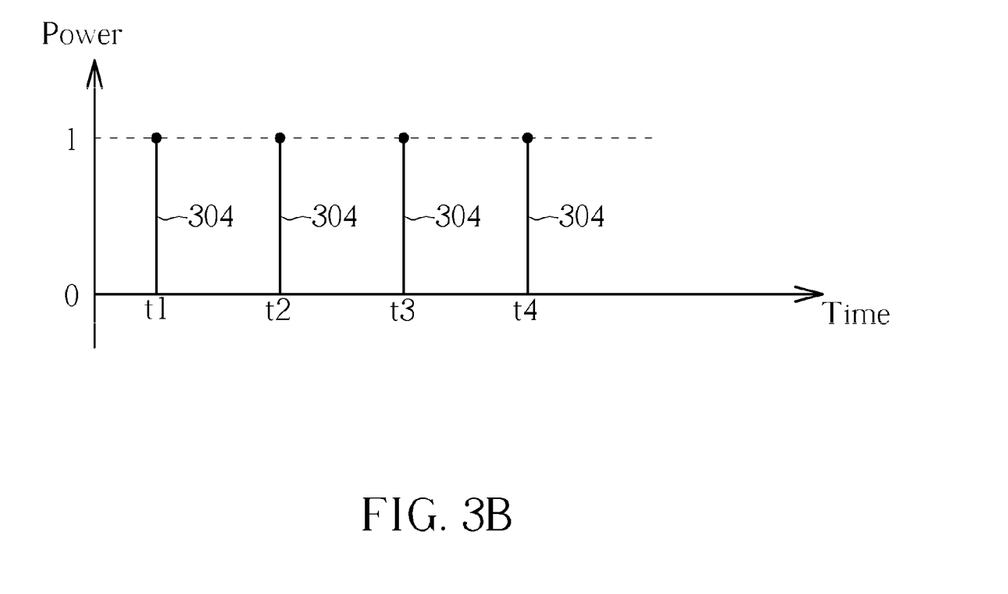
FIG. 3B is a timing diagram of powers corresponding to the peak and the trough of the ideal header shown in FIG. 3.

Furthermore, the transmitting time T of the header 202 of a BT packet is generally 54 us, and the signal cycle of the header 202 is generally 2 us. Thus, within the transmitting time T of the header 202, a peak or trough occurs every 1 us (i.e., each half cycle), theoretically, wherein the peak represents bit data "1", and the trough represents bit data "−1". After the peak power or trough power is sampled, the power of the bit data "1" and the power of the bit data "−1" should be a constant value. Therefore, the header 202 of a BT packet includes 54 samples, theoretically. For brevity, the constant value may be normalized as 1, as shown in FIG. 3A and FIG. 3B. FIG. 3A is a signal timing diagram of the header 202 in an ideal BT packet according to the present invention, and FIG. 3B is a timing diagram of powers corresponding to the peak and the trough of the header 202 shown in FIG. 3A. The curve 302 is a voltage variation curve of the ideal header 202, and the curve 304 is the power of the sampling points.

Figure 4A:
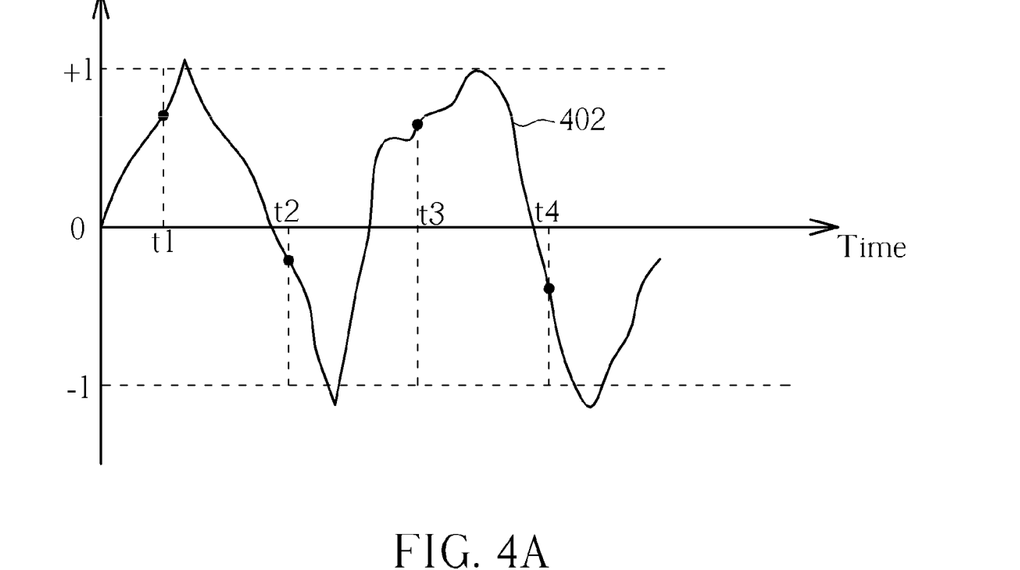
FIG. 4A is a signal timing diagram illustrating a header in an interfered Bluetooth packet according to the present invention.
Figure 4B:
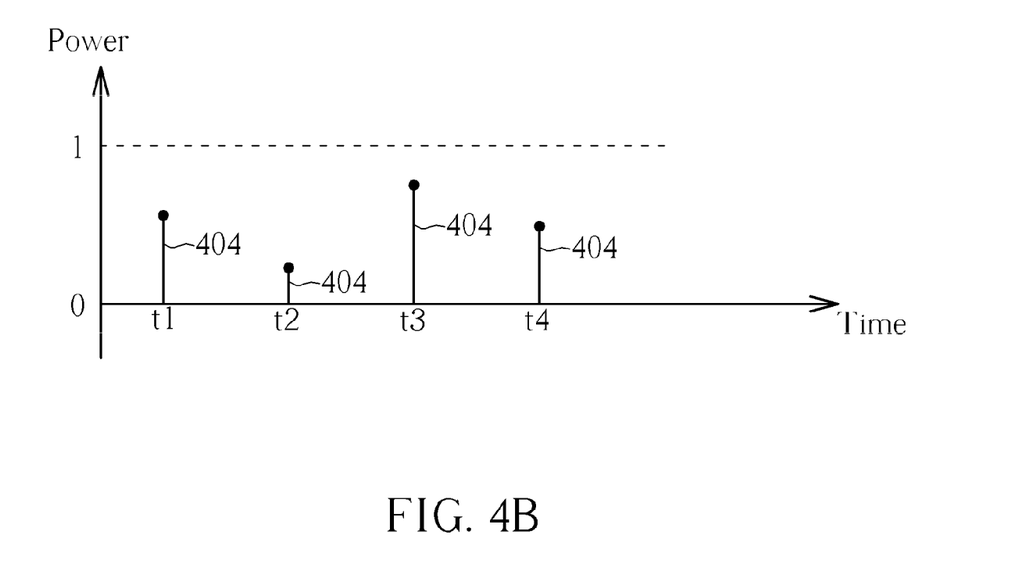
FIG. 4B is a timing diagram of powers each corresponding to one half cycle of the interfered header shown in FIG. 4.

However, when a BT packet suffers from interference (e.g., the BT packet is interfered with the signal generated from the nearby WLAN system), the header 202 of the BT packet will not present a wave with a constant envelope, and the time difference between the peak and the trough is not equal to an ideal half cycle. In other words, when a BT packet suffers from interference, the signal output from the FOC circuit 109 loses Gaussian filtering characteristics, so the synchronization timing and the best sampling timing of the header 202 of the BT packet will be shifted, causing that the powers each being sampled in a half cycle are not a constant value, as shown in FIG. 4A and FIG. 4B. FIG. 4A is a signal timing diagram illustrating a header 202 in an interfered BT packet according to the present invention. FIG. 4B is a timing diagram of powers each corresponding to one half cycle of the header 202 in the interfered BT packet shown in FIG. 4A. The curve 402 is a voltage variation curve of the interfered header 202, and the curve 404 represent powers corresponding to the sampling points.

As described above, in order to determine if the channel quality of the signal transmitting channel satisfies the predetermined quality standard, regarding each BT packet, the receiving circuit 101 chooses a ratio between a maximum power $\max_n^{arg}(S^2(n))$ and a minimum power $\min_n^{arg}(S^2(n))$ from the sampled powers to generate a header quality parameter HQ. Therefore, in an ideal situation (i.e., when the signal transmitting channel is not interfered (as shown by the situation in FIG. 3A and FIG. 3B), the maximum power $\max_n^{arg}(S^2(n))$ is substantially equaled to the minimum power $\min_n^{arg}(S^2(n))$, so the value of the header quality parameter HQ is roughly 0 dB. When the signal transmitting channel is interfered (as shown by the situation in FIG. 4A and FIG. 4B), the maximum power $\max_n^{arg}(S^2(n))$ is not equal to the minimum power $\min_n^{arg}(S^2(n))$, so the value of the header quality parameter HQ exceeds 0 dB. Therefore, the determining circuit 102 may determine if the signal transmitting channel is capable of being utilized for transmitting a BT packet according to a predetermined value (e.g. 10 dB). Moreover, when the header quality parameter HQ is not smaller than the predetermined value, the determining circuit 102 determines that the channel quality of the signal transmitting channel does not satisfy the predetermined quality standard, and therefore controls the AFH mechanism to avoid using this channel. On the contrary, when the header quality parameter HQ is smaller than the predetermined value, the determining circuit 102 determines that the channel quality of the signal transmitting channel satisfies the predetermined quality standard, and therefore transmits a BT packet via this channel.

In view of above description directed to the characteristics of the channel quality determining circuit 100, one can readily know that, with a properly configured predetermined value of the determining circuit 102, the channel quality of a signal transmitting channel basically may be determined by only using the header 202 of a BT packet. In other words, the channel quality of the 79 signal transmitting channels utilized by the BT system may all be determined by utilizing headers 202 of respective 79 BT packets. In this way, the channel quality of a signal transmitting channel can be determined quickly. Of course, it is not meant to be a limitation of the present invention that one channel quality of a signal transmitting channel is only determined by one header 202 of a BT packet. In order to improve the channel quality determination accuracy, headers 202 of a plurality of BT packets may be utilized for determining the channel quality of one signal transmitting channel, which also falls within the scope of the present invention. For example, supposing that the transmitting time of each BT packet is 625 us, the shortest time required by the present invention for determining the channel quality of all 79 signal transmitting channels utilized by the BT system is 79*625 us (about 50 ms).

Moreover, in some special situation (e.g., a signal transmitting channel is interfered with a strong and long lasting signal), the BT receiver may not receive any BT packets from the signal transmitting channel at all, so the timer 103 of the channel quality determining circuit 100 of the present invention is utilized for counting the predetermined time period. When the receiving circuit 101 receives a BT packet before the predetermined time period counted by the timer 103 expires, the determining circuit 102 performs the determining operation described above. When the predetermined time period counted by the timer 103 expires but the receiving circuit 101 fails to receive any BT headers from the signal transmitting channel, the determining circuit 102 further determines that the channel quality of the signal transmitting channel fails to satisfy the predetermined quality standard, and controls the AFH mechanism to switch to a next signal transmitting channel for detect the channel quality continually. Please note that implementing the timer 103 by hardware is not meant to be a limitation of the present invention. Alternatively, the timer 103 may be implemented by software. Briefly summarized, the channel quality determining circuit 100 of the present invention is capable of detecting channel qualities of the respective signal transmitting channels in the BT system quickly and accurately.

Figure 5:
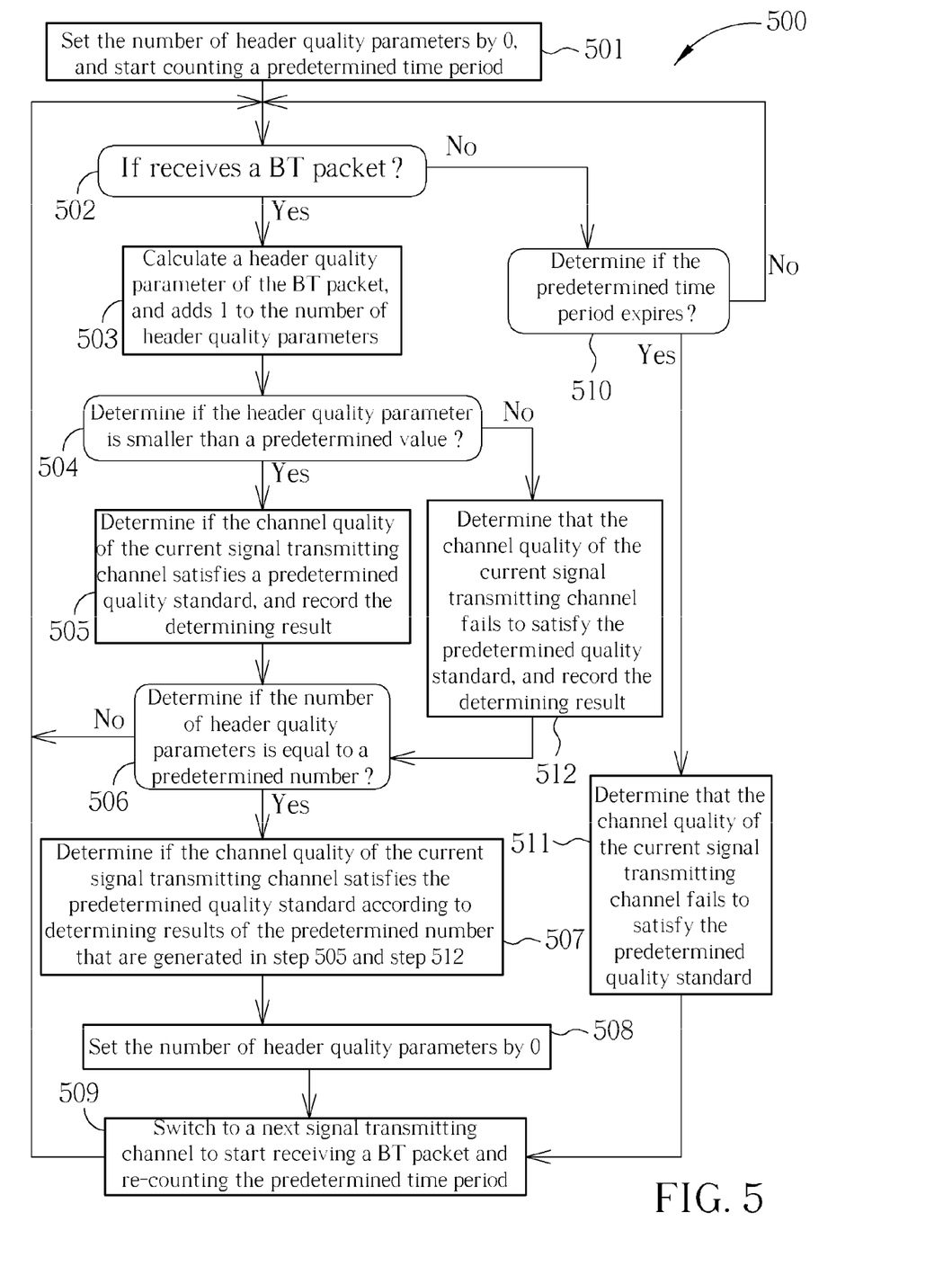
FIG. 5 is a flowchart illustrating an exemplary embodiment of a channel quality determining method according to the present invention.

The operation of the channel quality determining circuit 100 in the exemplary embodiment mentioned above may be further illustrated by a channel quality determining method 500, as shown in FIG. 5. FIG. 5 is a flowchart of an exemplary embodiment of the channel quality determining method 500 according to the present invention. For clearly illustrating features of the present invention, the following description of the channel quality determining method 500 is detailed along with the description of the channel quality determining circuit 100 of the present invention; however, the disclosed exemplary embodiments are not meant to be limitations to the scope of the present invention. The channel quality determining method 500 includes following steps:

Step 501: Set the number of header quality parameters HQ by 0, and start receiving a BT packet from a current signal transmitting channel and counting a predetermined time period;

Step 502: Determine if a BT packet is received. If yes, go to step 503; otherwise, go to step 510;

Step 503: Calculate a header quality parameter HQ of the BT packet, and adds 1 to the number of header quality parameters HQ. Go to step 504;

Step 504: Determine if the header quality parameter HQ is smaller than a predetermined value. If yes, go to step 505; otherwise, go to step 512;

Step 505: Determine that the channel quality of the current signal transmitting channel satisfies a predetermined quality standard, and record the determining result. Go to step 506;

Step 506: Determine if the number of header quality parameters HQ is equal to a predetermined number. If yes, go to step 507; otherwise, go to step 502;

Step 507: Determine if the channel quality of the current signal transmitting channel satisfies the predetermined quality standard according to determining results of the predetermined number that are generated in step 505 and step 512;

Step 508: Set the number of header quality parameters HQ by 0;

Step 509: Switch to a next signal transmitting channel to start receiving a BT packet and re-counting the predetermined time period. Go to step 502;

Step 510: Determine if the predetermined time period expires. If yes, go to step 511; otherwise, go to step 502;

Step 511: Determine that the channel quality of the current signal transmitting channel fails to satisfy the predetermined quality standard. Go to step 509;

Step 512: Determine that the channel quality of the current signal transmitting channel fails to satisfy the predetermined quality standard, and record the determining result. Go to step 506.

First of all, before the BT receiver wants to receive a BT packet from a current signal transmitting channel, the receiving circuit 101 sets the number of header quality parameters HQ corresponding to the current signal transmitting channel by 0, wherein the number of header quality parameters HQ is a predetermined number. Meanwhile, the timer 103 starts to count the predetermined time period when the BT receiver starts to receive a BT packet. In step 503, when the BT receiver receives a BT packet, the receiving circuit 101 calculates the header quality parameter HQ of the received BT packet according to equation (1) described above, and adds 1 to the number of header quality parameters HQ. When the determining circuit 102 determines that the channel quality of the current signal transmitting channel satisfies a predetermined quality standard according to the header quality parameter HQ, the determining result is recorded first (step 505). On the contrary, when the determining circuit 102 determines that the channel quality of the current signal transmitting channel fails to reach the predetermined quality standard, the determining result is also recorded first (step 512). Then, the determining circuit 102 determines if the number of header quality parameters HQ is equal to the predetermined number (step 506). If the number of the header quality parameters HQ fails to reach the predetermined number, the channel quality determining circuit 100 performs steps 502-506 repeatedly until the number of header quality parameters HQ reaches the predetermined number.

In order to improve the accuracy of determining the channel quality of a signal transmitting channel, the determining circuit 102 in step 507 determines if the channel quality of the current signal transmitting channel satisfies the predetermined quality standard according to determining results of the predetermined number that are generated in step 505 and step 512. In other words, only when all the determining results of the predetermined number show that the channel quality of the current signal transmitting channel satisfies the predetermined quality standard, the determining circuit 102 determines that the channel quality of the current signal transmitting channel is really capable of being utilized for transmitting BT packets. However, this is not meant to be a limitation of the present invention. In other exemplary embodiments, the determining circuit 102 may be designed to determine that the channel quality of the current signal transmitting channel is really capable of being utilized for transmitting BT packets when more than half (or any certain number) of determining results of the predetermined number show that the channel quality of the current signal transmitting channel satisfies the predetermined quality standard.

After the channel quality of the current signal transmitting channel is determined, the channel quality determining circuit 100 switches to the next signal transmitting channel (step 509) and repeats steps 502-508 for determining the channel quality of the next signal transmitting channel.

In step 502, when the receiving circuit 101 fails to receive a BT header, the receiving circuit 101 is still waiting for expiration of the predetermined time period. If the receiving circuit 101 fails to receive any BT headers from the current signal transmitting channel when the predetermined time period expires, the determining circuit 102 directly determines that the channel quality of the signal transmitting channel fails to satisfy the predetermined quality standard (step 511). The reasons are already detailed in above paragraphs. Next, the AFH mechanism of the BT receiver switches to the next signal transmitting channel to keep detecting the channel quality. On the contrary, when the receiving circuit 101 receives a BT header during the predetermined time period, the flow goes to step 503 and following steps to determine the channel quality of the current signal transmitting channel. Therefore, by performing steps 501-512 revealed in the channel quality determining method 500, the channel quality determining circuit 100 may determine the channel qualities of the respective signal transmitting channels of the BT system quickly and accurately.

In summary, the header 202 that has not been decoded into digital data signal of the received BT packet is utilized by the present invention for determining if the channel quality of the signal transmitting channel satisfies the predetermined quality standard. Since a fewer number of BT packets are utilized in the present invention and the time required for decoding the received BT packets into digital data signals is saved, the channel quality determining circuit 100 of the present invention is capable of determining if the channel quality of the signal transmitting channel satisfies the predetermined quality standard quickly.

Those skilled in the art will readily observe that numerous modifications and alterations of the device and method may be made while retaining the teachings of the invention.

What is claimed is:

1. A channel quality determining circuit, comprising:
   a receiving circuit, for receiving a header of at least one packet transmitted in a signal transmitting channel; and
   a determining circuit, coupled to the receiving circuit, for determining if a channel quality of the signal transmitting channel satisfies a predetermined quality standard according to the header of the at least one packet, wherein the determining circuit determines if the channel quality of the signal transmitting channel satisfies the predetermined quality standard according to a plurality of powers corresponding to the header of the at least one packet, wherein a first of the plurality of powers is at a different power level than a second of the plurality of powers.

2. The channel quality determining circuit of claim 1, further comprising:
   a timer, coupled to the receiving circuit and the determining circuit, for counting a predetermined time period when the receiving circuit starts operating;
   wherein when the receiving circuit receives the header of the at least one packet before the predetermined time period counted by the timer expires, the determining circuit determines if the channel quality of the signal transmitting channel satisfies the predetermined quality standard according to the header of the at least one packet.

3. The channel quality determining circuit of claim 2, wherein when the predetermined time period counted by the timer expires and the receiving circuit does not receive any headers through the signal transmitting channel during the predetermined time period, the determining circuit further determines that the channel quality of the signal transmitting channel fails to satisfy the predetermined quality standard.

4. The channel quality determining circuit of claim 1, wherein the receiving circuit generates a header quality parameter according to sampling a plurality of powers at a plurality of time points, and the determining circuit determines if the channel quality of the signal transmitting channel satisfies the predetermined quality standard according to the header quality parameter of the header of the at least one packet.

5. The channel quality determining circuit of claim 4, wherein each of a plurality of time differences between the time points is an integral multiple of a half cycle of the header.

6. The channel quality determining circuit of claim 4, wherein the receiving circuit generates the header quality parameter by calculating a ratio between a maximum power and a minimum power among the powers.

7. The channel quality determining circuit of claim 6, wherein when the ratio is not smaller than a predetermined value, the determining circuit determines that the channel quality of the signal transmitting channel fails to satisfy the predetermined standard.

8. A channel quality determining method, comprising:
   receiving a header of at least one packet transmitted in a signal transmitting channel; and
   determining if a channel quality of the signal transmitting channel satisfies a predetermined quality standard according to the header of the at least one packet, wherein the determining comprises determining if the channel quality of the signal transmitting channel satisfies the predetermined quality standard according to a plurality of powers corresponding to the header of the at least one packet, wherein a first of the plurality of powers is at a different power level than a second of the plurality of powers.

9. The channel quality determining method of claim 8, further comprising:
   counting a predetermined time period;
   wherein when the header of the at least one packet is received before the counted predetermined time period expires, the header of the at least one packet is referred to for determining if the channel quality of the signal transmitting channel satisfies the predetermined quality standard.

10. The channel quality determining method of claim 9, wherein when the counted predetermined time period expires and there is no header received through the signal transmitting channel during the predetermined time period, it is determined that the channel quality of the signal transmitting channel fails to satisfy the predetermined quality standard.

11. The channel quality determining method of claim 8, wherein the step of receiving the header of the at least one packet transmitted in the signal transmitting channel comprises:
generating a header quality parameter according to sampling a plurality of powers at a plurality of time points; and
the step of determining if the channel quality of the signal transmitting channel satisfies the predetermined quality standard according to the header of the at least one packet comprises:
determining if the channel quality of the signal transmitting channel satisfies the predetermined quality standard according to the header quality parameter of the header of the at least one packet.

12. The channel quality determining method of claim 11, wherein each of a plurality of time differences between the time points is an integral multiple of a half cycle of the header.

13. The channel quality determining method of claim 11, wherein the step of generating the header quality parameter according to the powers of the header of the at least one packet that are respectively estimated at the time points comprises:
generating the header quality parameter by calculating a ratio between a maximum power and a minimum power among the powers.

14. The channel quality determining method of claim 13, wherein when the ratio is not smaller than a predetermined value, it is determined that the channel quality of the signal transmitting channel fails to satisfy the predetermined quality standard.

15. The channel quality determining method of claim 8, wherein the step of determining if the channel quality of the signal transmitting channel satisfies the predetermined quality standard according to the plurality of powers corresponding to the header of the at least one packet comprises:
determining if the channel quality satisfies the predetermined quality standard according to a ratio between a maximum power and a minimum power of the plurality of powers.

* * * * *